Jan. 30, 1968  F. W. RUIJS  3,366,324
SETTING DEVICE FOR IMPARTING BY MEANS OF A NUMBER OF
OPERATING MEMBERS A NUMBER OF DIFFERENT ANGULAR
DISPLACEMENTS TO A DRIVING SHAFT
Filed Oct. 24, 1966  5 Sheets-Sheet 1

INVENTOR.
Frans W. Ruijs
BY
Karl W. Flocks
attorney

Jan. 30, 1968        F. W. RUIJS        3,366,324
SETTING DEVICE FOR IMPARTING BY MEANS OF A NUMBER OF
OPERATING MEMBERS A NUMBER OF DIFFERENT ANGULAR
DISPLACEMENTS TO A DRIVING SHAFT

Filed Oct. 24, 1966        5 Sheets-Sheet 2

INVENTOR.
BY Frans W. Ruijs
Karel W. Flock
Attorney

Jan. 30, 1968 F. W. RUIJS 3,366,324
SETTING DEVICE FOR IMPARTING BY MEANS OF A NUMBER OF
OPERATING MEMBERS A NUMBER OF DIFFERENT ANGULAR
DISPLACEMENTS TO A DRIVING SHAFT
Filed Oct. 24, 1966 5 Sheets-Sheet 4

INVENTOR.
Frans W. Ruijs
BY
Karl W. Flocks

Jan. 30, 1968   F. W. RUIJS   3,366,324
SETTING DEVICE FOR IMPARTING BY MEANS OF A NUMBER OF
OPERATING MEMBERS A NUMBER OF DIFFERENT ANGULAR
DISPLACEMENTS TO A DRIVING SHAFT
Filed Oct. 24, 1966   5 Sheets-Sheet 5

INVENTOR.
Frans W. Ruijs
BY

United States Patent Office 3,366,324
Patented Jan. 30, 1968

3,366,324
SETTING DEVICE FOR IMPARTING BY MEANS OF A NUMBER OF OPERATING MEMBERS A NUMBER OF DIFFERENT ANGULAR DISPLACEMENTS TO A DRIVING SHAFT
Frans W. Ruijs, Ubrechtseweg 19, De Bilt, Netherlands
Continuation-in-part of application Ser. No. 493,160, Oct. 5, 1965. This application Oct. 24, 1966, Ser. No. 589,051
Claims priority, application Netherlands, Oct. 5, 1964, 64—11,580; Sept. 8, 1965, 65—11,733
12 Claims. (Cl. 235—60)

ABSTRACT OF THE DISCLOSURE

Key-operated setting device which is provided with a coupling driven by an actuating shaft to drive an operating shaft for rotation, each cycle through one complete revolution, returning to an initial position and stopped therein by a stop which brings about a shifting of elements rotating with the operating shaft to declutch said coupling, and for cooperation during said complete revolution with one stop of digit stop means associated with digit keys to bring about a disengagement of a setting wheel arranged on the operating shaft from total wheels and possibly from reading wheels and to bring about the performance of other functions, such as retraction of said digit stop, which setting wheel is engaged on operation of a key.

---

This is a continuation-in-part of application Ser. No. 493,160, filed Oct. 5, 1965, now abandoned.

This invention relates to a key-operated setting device of the kind comprising a plurality of operating members each for imparting to an operating shaft an angular displacement corresponding with said operating member, said operating shaft operating a setting mechanism.

The known devices of this kind have various disadvantages, such as complexity, poor operating velocity, requiring undue operating forces.

In order to obviate these drawbacks, the present invention provides a key-operated setting device for imparting a number of different angular displacements to an operating shaft, comprising a number of keys and a number of stops, said number of stops corresponding with the number of keys, each of said stops being settable by one of said keys for defining the angular displacement of said operating shaft, said operating shaft being provided with at least one stop cam cooperating with said stops, an actuating shaft, a non-slipping coupling provided between said actuating shaft and the operating shaft, a transmission mechanism between said keys and the non-slipping coupling for clutching in said non-slipping coupling on actuation of a key until the stop cam abuts against the stop actuated by the operated key and means for throwing out said non-slipping coupling when the operating shaft return in its initial position.

In this device, the actuating shaft may be continuously driven by a motor. The coupling between the operating shaft and the actuating shaft may, for example, be a dog clutch causing the operating shaft to perform one single complete revolution, while during the revolution of the operating shaft, as soon as the angular displacement set has been effected, an interruption of the rotation takes place in order for the setting member to be connected with or disconnected from the setting mechanism, and if so desired, for returning the operated parts or other functions of the machine to their inoperative position. Instead of performing a complete revolution, the operating shaft may also be returned to its initial position by being turned back.

If desired, a slip-coupling may be provided between the driving motor and the non-slipping coupling. By virtue of this arrangement the non-slipping coupling need not be disconnected. As a slip-coupling, for example, a friction clutch may be used. If so desired, the slip-coupling may be adjustable so that the magnitude of the driving force necessary for carrying out the required functions may be regulated.

The setting device according to the invention can be used for numerous purposes, for example, calculating machines, the selector mechanism of a telephone, etc.

Further features of the invention will become apparent from the following description with reference to the accompanying drawings, showing diagrammatically and by way of example some embodiments of the setting device according to the invention. In said drawings:

FIG. 8 shows part of a third embodiment;

Figures 1, 2:
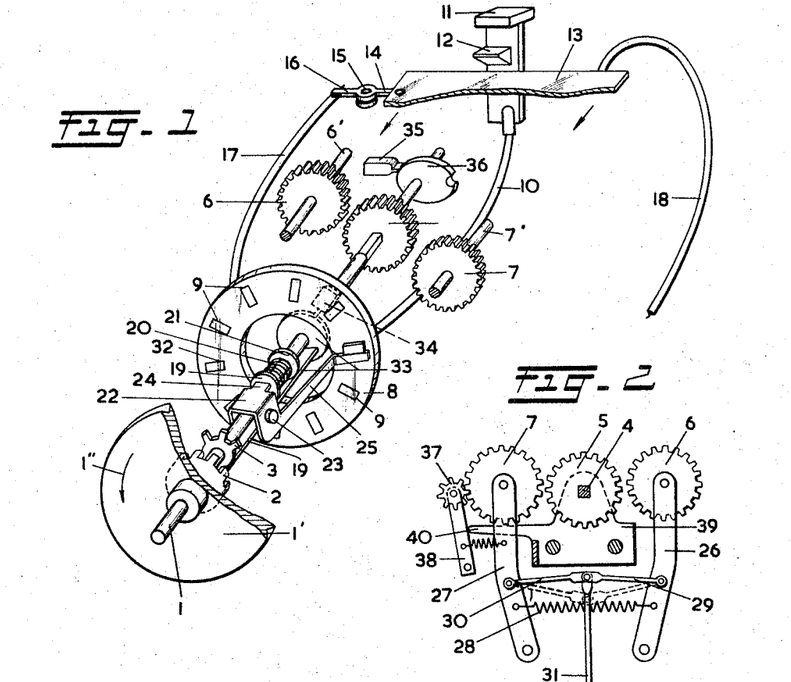
FIG. 1 is a perspective view of part of a first embodiment of a device according to the invention.
FIG. 2 shows a side view of the reading and total wheels co-operating with the setting wheel of this device.

Referring to FIGURE 1 reference numeral 1 denotes an actuating shaft having keyed thereon a pulley 1' which is continuously driven in the direction shown by the arrow 1" by a motor (not shown). The actuating shaft 1 can be coupled to an operating shaft 4 by means of a dog clutch 2, 3. Slidably mounted on the operating shaft 4, in any manner known per se, is a setting wheel 5 which, as will be described hereinafter with reference to FIGURE 2, is capable of rotating wheels 6, mounted on a shaft 6', and wheel 7, mounted on a shaft 7'. Of the wheel 6 as well as of the wheels 7, only one single wheel is shown in the drawings. The wheels 6 serve for setting reading elements for reading the value introduced by the setting wheel 5, and will hereinafter be referred to as reading wheels 6. The wheels 7 serve for transmitting the values introduced to a counting mechanism, and will hereinafter be referred to as total wheels.

Fixedly mounted on a frame (not shown) is an annular holder 8 provided with ten holes distributed along the periphery of a circle. One of said holes has slidably mounted therein a stop 32, each of the other holes one of nine stops 9. Each of the stops 9 is connected with a spring-biased key 11 corresponding with one of the numerical values 1–9. Only one key 11 is shown in the drawings. Each of the keys 11 corresponding with one of the numerical values 1–9 has a projection 12 provided with a bevel which when the associated key is impressed moves a spring-loaded slidable plate 13. The plate 13 is connected with one arm 14 of a lever 14, 16 pivoted to the frame at 15. The other lever arm 16 is connected through a Bowden cable 17 with the stop 32 corresponding to the zero value. Connected to the plate 13 is another Bowden cable 18 which, in a manner to be described hereinafter, is capable of coupling the setting wheel 5 with the reading wheels 6 and the total wheels 7.

The operating shaft 4 is inserted through openings in the two legs of a U-shaped coupling element 19, so that the latter is slidable on the shaft 4 against the action of a spring 20. One end of the spring 20 bears against a collar 21 formed on the operating shaft 4, and the other end against a leg of the coupling element 19. The leg of the coupling element remote from the spring 20 constitutes the clutch portion 3 of the dog clutch 2, 3.

Mounted on the operating shaft 4 is further a U-shaped brace 22 with its two legs on opposite sides of the shaft 4. The brace 22 is rotatable about a bolt 23, which extends transversely through, and is fixed in the operating shaft 4, so that the brace 22 is not rotatable about the shaft 4. This also results in the coupling element 19, which is fittingly confined between the legs of the brace 22, being restrained from rotation, but allowed to slide, relative to the shaft 4.

The brace 22 has a tongue 24, against which bears the leg of the coupling element 19 loaded by spring 20. Connected to one of the legs of the U-shaped brace 22 is an arm 25, the end of which cooperate with the stops 9. In the exploded view of FIGURE 1, the arm 25 is longer than corresponds to its actual length.

In the inoperative position, the stop 32 extends into the path of movement of the arm 25, and the stops 9 are retracted from that path.

When a key 11 of the machine shown in FIGURE 1, for example the key 11 corresponding with the numerical value 5, which hereinafter will be designated "5" is depressed the associated stop 9 is moved from the holder 8 into the path of the end of the arm 25 during the first phase of such depression, and at the same time the projection 12 moves the plate 13, as a result of which the Bowden cable couples the setting wheel 5 with one of the reading wheels 6 and one of the total wheels 7. For this purpose the reading wheels 6 and the total wheels 7 are rotatably mounted in levers 26, 27, pivoted to the machine frame, there being arranged between said levers a spring 28 urging the levers towards each other. Interposed between the levers 26 and 27 is a toggle joint formed by rods 29, 30, the common pivot of which is connected to a rod 31 which upon the movement of the plate 13 is pulled downwards by the Bowden cable 18.

After the setting wheel has been coupled with a reading wheel 6 and a total wheel 7, the plate 13 continues its movement during the second phase of the depression of the key 11, as a result of which the lever 14, 16 is rotated so far that the zero stop 32 is retracted by the Bowden cable 17, and the arm 25 is released. As soon as the arm 25 has been released, the spring 20 urges the coupling element 19 in the direction of the rotating clutch half 2, so that the clutch 2, 3 is engaged and the operating shaft 4 is driven until the arm 25 abuts against the stop associated with the "5" key, which has been pushed into its path of movement. The setting wheel has then turned through the angle corresponding with the numerical value 5, and has also rotated the corresponding reading wheel 6 and the corresponding total wheel 7 through the corresponding angles.

When the arm 25 abuts against the stop associated with the "5" key the brace 22 is rotated by the retained arm 25 about the bolt 23, which slides back the coupling element 19 along the operating shaft 4 until the clutch 2, 3 is disengaged and the shaft 4 stands still. The coupling element has an extension 33, by which the coupling element, when the clutch 2, 3, is disengaged, operates a microswitch 34 to close the electric circuit of an electromagnet (not shown) which thereby pushes the rod 31 upwardly so that the wheels 6 and 7 are disengaged from the setting wheel 5, and a carriage 39, shown in FIGURE 2 and axially coupled with the setting wheel 5 on the shaft 4, is laterally displaced over a distance corresponding with one decimal and other operated parts of the machine are returned to their inoperative position. When, during this operation, the "5" key returns into its initial position the Bowden cable 10 withdraws the stop corresponding with the "5" key, so that the clutch 2, 3 is again engaged and remains so until the arm 25 comes into contact with the zero stop 32, which extends again into its path of movement, so that the clutch 2, 3 is disengaged for the second time in this operating cycle, and which completes said cycle.

In order to prevent that during this second disengagement of the clutch 2, 3 the microswitch 34 would again close the circuit of the electromagnet (not shown), there is provided a microswitch 35, series connected with the microswitch 34, and cooperating with a cam 36 provided on the operating shaft 4 to break the electric circuit to the microswitch 34 in the zero position.

In FIGURE 2, 37 designates one of the known per se transmission wheels, each of which is mounted on a lever 38 of its own. The carriage 39 axially coupled with the setting wheel 5 has a projection 40, which retains the lever 38 of the transmission wheel 37, which is located opposite the setting wheel 5, when the total wheels 7 are moved towards the shaft 4. The transmission wheel is thereby moved into its disengaged position, whereas the other transmission wheels remain engaged with the associated total wheels.

Figure 3:
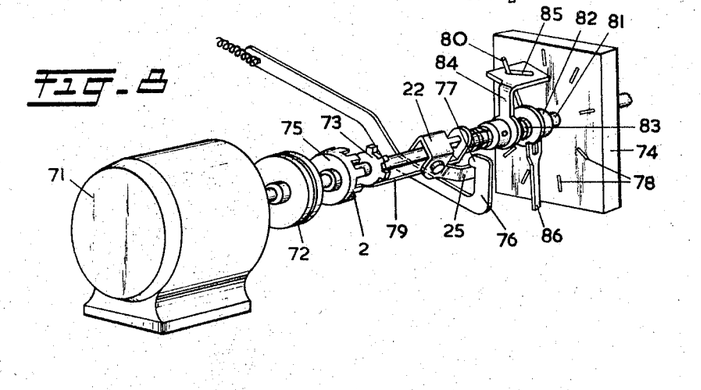
FIG. 3 shows, partly in side view and partly in section, a second embodiment of the device according to the invention.

In the embodiment of the key mechanism as shown in FIGURES 3–7, 41 designates a keyboard having ten keys 42 for the numerical values 0–9, inclusive. As shown for the key bearing the digit 5, each key 42 has a rod 44 provided with a pin 43. The pin 43 cooperates with a bevelled cam 45 arranged on one of a plurality of horizontal operating rods 46 of rectangular cross-sectional configurations, only one of which is shown in FIGURE 3. The rods 46 are slidably guided in rectangular apertures 47 formed in a plate 48 of the machine frame so as to be distributed along the periphery of a circle. When a key is depressed, the associated pin 43 urges the associated rod 46 to the right against the action of a spring 49. As a result the rod 46 moves a stop 50. The stops 50 are slidably mounted in rectangular, radially elongated apertures 51 formed in a disk 52 so as to be uniformly spaced about the circumference of a circle. The disk 52 is mounted in the frame 48 of the machine so as to be rotatable through a small angle.

Each stop 50 has on its ends facing the corresponding rod 46 a plate 54 to provide an amply dimensioned abutment face for the operating rods 46. The stops 50 are biased by an annular spring 55.

When a key 42 is depressed, the corresponding operating rod 46 moves the corresponding stop 50 to the right (as seen in the drawing) so that the latter projects from the disk 52 on the right-hand side thereof. When the stop 50 is moved, the plate 54 of this stop displaced a generally round plate 57 mounted on the armature of an electromagnet 56 secured to the frame so that said plate operates a spring-biased lever 58 pivotally mounted in the machine frame and provided with a shoulder 59 for this purpose. Peripherally spaced from the lever 58, relative to the plate 57, is a similar spring-biased lever 60 having a shoulder 67 (see FIGURE 7).

When the plate 57 slides over the shoulder 59 the lever 58 pivots and thereby temporarily closes a contact, not shown, in a circuit which energizes an electromagnet which moves shift means, not shown, by which the setting wheel 68 is coupled with elements not shown in FIGS. 3–7, namely with one of the total wheels and possibly with a reading wheel, and a non-slipping clutch, for example, a dog clutch, which is engaged as described in respect of the first embodiment. After the operation of the lever 58 it returns into its initial position by the action of its spring, with the shoulder 59 on the other side of the plate 57.

As soon as the clutch of which one part is arranged on the operating shaft 69 is engaged, the operating shaft 69 starts to rotate, which causes the stop 61 of the arm 62 mounted on the shaft 69 to contact the outwardly projecting stop 50, and causes the disk 52 to be turned through a small angle to close a microswitch 63. The microswitch 63 is connected in a circuit (not shown) with the electromagnet 56, so that the electromagnet 56 is energized to withdraw the plate 57 axially into its initial position, which plate takes along the projecting stop 50. During the preceding rotation of the disk 52 the latter has also caused the plate 57 to turn through a small angle. For this purpose the plate 57 has a projection 64 which is slidably received in a bushing 65 secured to the disk 52. As a result of this rotation of the plate 57, the projection 59 of the lever 58 comes opposite a recess 66 of the plate 57 while the shoulder 67 of the lever 60, which was first opposite the recess 66, comes opposite a marginal portion of the plate 57. When the plate moves axially backwardly, it will accordingly only actuate the lever 60, which temporarily closes a contact in a circuit, not shown, which energizes an electromagnet, not shown, which moves said shift means reversely to their movement brought about upon the closing of a contact by the lever 58, which return movement of the shift means disengages the setting wheel 68, and displaces the carriage in which the setting wheel 68 which is mounted so as to be shiftable over a square end of the operating shaft 69, and displaces a carriage like the carriage 39 in FIGURE 2, which carriage takes along the setting wheel 68 over; shaft 69 and is then further driven until, after a rotation through an angle of 360°, it has returned into its starting position with the stop 61.

As the forces required for the performing of the functions are very small the levers 58 and 60, if connected by suitable elements, can perform the functions concerned directly without the intermediary of electromagnetic means. For instance, the engagement and disengagement of the setting wheel can be performed as illustrated in FIG. 2 by moving the rod 31 downward and upwards by the lever 58 and the lever 60, respectively.

In the embodiment illustrated in FIGS. 3–7, the zero stop is provided such that in the zero position the position of the stop 61 relative to the first stop is compensated in connection with the small additional angle through which the disk 52 has rotated, as mentioned before, since otherwise the teeth of the setting wheel and of the gears to be driven thereby are not meshed in the proper position.

In the embodiment shown in FIG. 8, the motor 71 drives a slipping coupling, for example, a friction clutch 72 interposed between a dog clutch 73, 75 and the drive motor 71. The slipping coupling 72 is preferably adjustable in order for it to be adjusted to the functions to be carried out. The coupling element 79 corresponds with the coupling element 19 shown in FIGURE 1, but without extension 33. The arm 25 of the U-shaped brace 22 catches behind a stop 77 mounted on the operating rod 76. When the operating rod 76 is longitudinally displaced to the right as viewed in the drawing, the element 25 is released from the stop 77, and the coupling element 79 will couple the dog clutch 73, 75 entirely in the same way as described in connection with the element 19 and the dog clutch 2, 3 shown in FIG. 1. The clutch 73, 75 is decoupled again when the element 25 is retained by the stop 77 after a revolution of the clutch portion 73. The stop 77 should therefore return into its arresting position in good time before the termination of this one revolution. For this purpose a spring is connected to the rod 76, which retracts this rod as soon as the latter is released by the means which causes the rod to move to the right. This means, not shown, may be of any suitable known kind, e.g. an electromagnet whose energizing circuit incorporates a first contact which can be closed by operating any of the keys 11, e.g. by means of an element 13 as shown in FIG. 1, as well as a second contact which is closed by a cam on the shaft 4, as, e.g., cam 36 in FIG. 1, but only in the zero position of the shaft 81, so that the energizing circuit is broken as soon as the shaft 81 has left the zero position. It is thereby obtained that the operating shaft always makes one complete revolution of 360° during each operating cycle.

When, however, the rod 76 is not electromagnetically actuated but through a mechanical connection directly by the keys, the operating shaft will make a number of complete idle revolutions extra, before being stopped in the initial position, depending on the time a key is kept depressed.

In the embodiment of FIG. 8, the stops (not shown) are slidably mounted in slots 78 in a plate 74 fixedly secured in the machine frame. An arm 80, corresponding with the arm 62 of FIG. 3, is secured to a bushing 82 which is rotatably and slidably mounted on the operating shaft 81. Said stops can be protracted from the slots 78 to such an extent that their ends extend into the path traced by the end of the arm 80 during rotation of the shaft 81. The bushing is biased by a spring 83. Fixedly secured to the operating shaft 81 is a support 84 having a slot 85 oblique to the shaft 81, through which extends the arm 80. When the arm 80 contacts a stop protracted through a slot 78, the arm 80 is displaced in the slot 85, as a result of which the bushing 82 is axially displaced to actuate an operating lever 86 which performs the necessary functions, i.e. the operation of a microswitch in an electric circuit, as the circuit which can be closed by the switch 34 in the embodiment of FIG. 1. However, as the forces required for the performing of the functions are very small, the lever 86 can perform these functions directly if connected by mechanical elements. During the rotation of the shaft 81 the support 84 and the arm 80 extending into the slot 85 of the support 84 rotate along with the shaft 81. So long as the arm 80 is retained by a stop protracted from a slot 78, the shaft 81 cannot complete its one revolution. Among the functions to be performed just referred to is the retraction of said stop. As soon as this has been effected, the means 80, 81, 84 rotate on to the zero position.

Figures 3, 4, 5, 6, 7, 9:
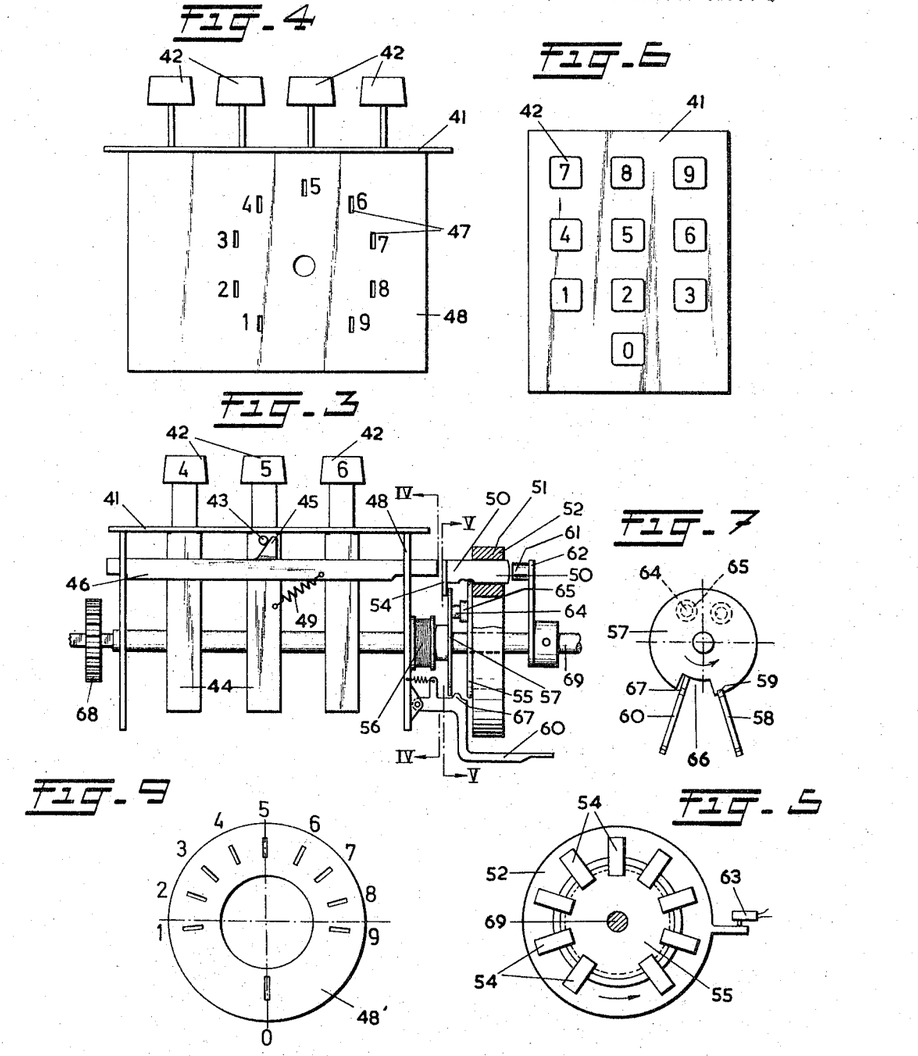
FIG. 4 is a cross-section on the line IV—IV in FIG. 3.
FIG. 5 is a cross-section on the line V—V in FIG. 3.
FIG. 6 is a plan view of a keyboard.
FIG. 7 shows a detail of the device of FIG. 3.
FIG. 9 shows stops non-uniformly spaced about the circumference of a circle.

As shown in FIGURE 9, it is possible for the stops and rods corresponding with the numerical values 1–9 to be uniformly distributed over a portion of the periphery of a circle. The rotation of the operating shaft through an angle corresponding with a free part of the periphery of the circle can then be used for performing certain functions by means of cams on the operating shaft and similar means, both before and after the passage of the zero stop.

Figure 10:
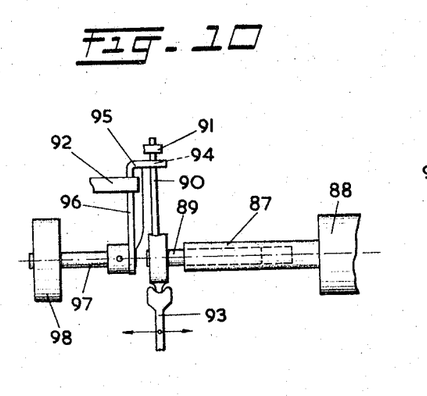
FIGS. 10 and 11 show part of a fourth embodiment.
Figure 11:
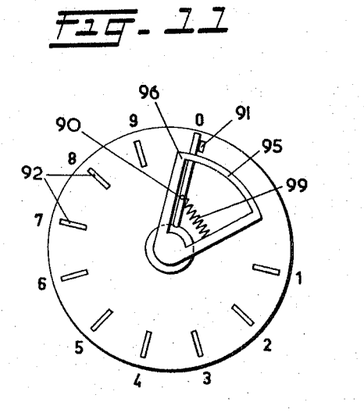

FIGURES 10 and 11 show an embodiment, omitting those parts which are not necessary for a proper understanding of this embodiment. The parts not shown can be constructed and arranged in any of the above described manners.

Referring to FIGS. 10 and 11, 87 is a bushing which is driven by a motor 88. The bushing 87 is internally unround. A pin 89 having a corresponding unround section fits the bushing 87 so as to be axially slidable therein. At the end of the pin 89 projecting from the bushing 87 is an arm 90. In the inoperative position of the device one end of the arm 90 is in abutment with a zero stop 91, which may be arranged, for example, in any of the manners described before, and is moved upon the actuation of a key. When the stop 91 is withdrawn, the arm 90 is released and can be turned by the shaft 87. The zero stop 91 is outside the plane of the circle to which the stops 92 operated by the keys 1–9 are brought. The other end of the arm 90 cooperates with an operating member 93 which performs the functions as required, i.e. through the intermediary of elements actuated by electromagnetic means by closing and breaking contacts in the circuit of said electromagnetic means.

The arms 90 extends into a slot 94 in a plate 95 provided at the end of a holder 96 cooperating with the stops 92, said slot crossing the shaft 87 at an oblique angle. This holder 96 is secured to the actuating shaft 97 of the setting wheel 98. Interposed between the holder 96 and the arm 90 is a spring 99, by virtue of which, after the holder 96 set in rotation contacts a stop 92, the arm 90 is allowed to turn through a further angle whilst compressing the spring 99, during which further rotation the arm 90, moving through the obliquely crossing slot 94, is axially displaced thereby actuating the operating member 93 for performing the required functions, among which returning the stops into the inoperative position.

The angle of the sector within which the arm 90 can move relative to the holder 96 decreases the peripheral portion of the setting gear 98 over which the teeth active for the setting operation are to be distributed.

In the device as shown in FIGS. 10 and 11, the arm 90 and the holder 96 also serve as a non-slipping clutch. The motor may, for example, be of the type permanently standing up to the electric voltage, even in the inoperative condition, or it may be continually switched on by the actuation of a key; if so desired a spring can be interposed.

It will be understood that the holder 96 can also be so constructed that it cooperates with the stops actuated by the keys, such stops, in a manner known per se, being spaced along the length of the actuating shaft 97 in uniform or non-uniform angular relationship.

Figure 12:
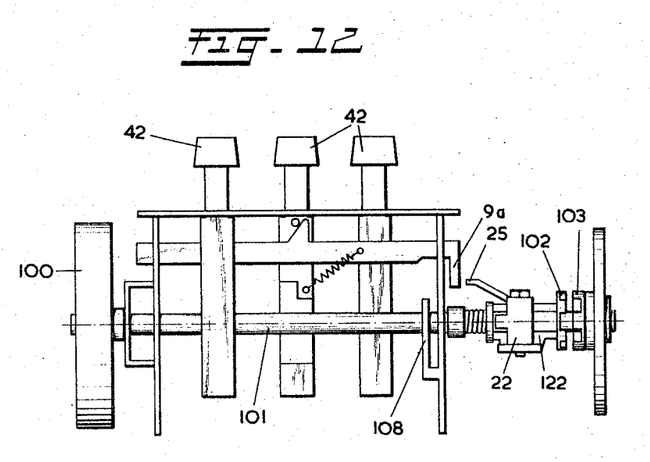
FIGS. 12–14 show part of an embodiment designed for the selector mechanism of a telephone.
Figure 13:
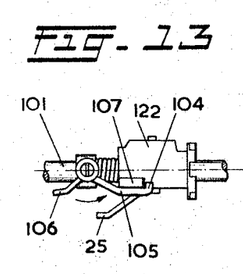
Figure 14:
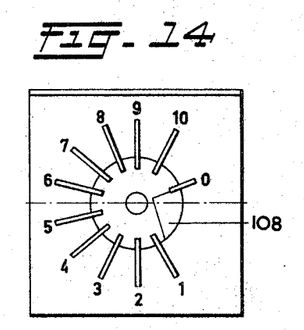

FIGS. 12–14 show an embodiment of the setting device which may serve to replace the selector mechanism of a telephone. In this embodiment the keyboard is constructed in the same manner as shown in FIG. 3, with the difference that the stops 50 are constituted by the ends of the operating rods 46. Mounted on the frame of the machine is a housing 100, accommodating the selector mechanism of the telephone. This selector mechanism is actuated by the operating shaft 101, on which is slidably mounted the clutch portion 122 of a dog clutch 102, 103, the part 103 of which is driven by a motor (not shown).

FIG. 13 shows the clutch portion 122 separately in a position in which the operating shaft 101 has turned 180° relative to the position of the operative shaft 101 in FIG. 12.

In the same way as shown in FIG. 1, the clutch portion 122 is actuated by a U-shaped brace 22, the arm 25 of which cooperates with the actuated stop 9A. After the actuation of a key 42, the dog clutch 102, 103 is engaged, as a result of which the shaft 101 turns until the arm 25 contacts the actuated stop 9a. This causes a pretensioned spring (not shown), of the selector mechanism to be tensioned more strongly.

When the arm 25 contacts the actuated stop 9a, the clutch is disengaged, the clutch portion 122 moving to the left as seen in the drawing. During this movement the hook-shaped end 104 of one arm of a pivoting locking pawl 105, 106 catches behind a projection 107 of the clutch portion 122, as a result of which the clutch portion 122 is retained in the disengaged position. By the action of the spring of the selector mechanism the shaft 101 is now returned through the same angle through which it has turned previously, during which the required number of pulses is transmitted to the telephone exchange as with a normal telephone having a selector dial.

The embodiments of FIGS. 1, 3–7, 8 and 10–11 have in common a coupling driven by an actuating shaft to drive an operating shaft for rotation, each cycle through one complete revolution, returning to an initial position and stopped therein by a stop which brings about a shifting of elements rotating with the operating shaft to declutch said coupling, and for cooperation during said complete revolution with one stop of digits stop means associated with digit keys to bring about a disengagement of a setting wheel arranged on the operating shaft from total wheels and possibly from reading wheels and to bring about the performance of other functions, such as retraction of said digit stop.

In all embodiments shown in FIGS. 1–11, there is, for performing the required functions or for causing the same to be performed, which includes causing the withdrawal of the digit stop protracted by the operation of a key, a cooperating with said digit stop during a small angular sector of the rotation of the operating shaft, which during this movement is still coupled to the drive shaft. In the embodiment of FIG. 1, a relative movement of the elements 20–25, which couple and operate the dog clutch, takes place within this angular sector, as a result of which the elements and/or contacts involved in the performance of the functions are operated. In the embodiment of FIGS. 3–7, the plate 52 rotates along with the digit stops and the auxiliary plate 57 during the rotation through the angular sector, as a result of which the elements and/or contacts involved in the performance of the functions are operated. In the embodiment of FIG. 8, power transmission members (80, 84) mounted on the shaft are moved relative to each other in the axial direction without the dog clutch means being influenced, as a result of which the elements and/or contacts involved in the performance of the functions are operated. In the embodiment of FIGS. 10 and 11 there is also a relative axial movement of power transmission elements 90, 94, 95 during the rotation through the angular sector, as a result of which the elements and/or contacts involved in the performance of the functions are operated.

When the clutch portion 122, which turns back along with the shaft 101, returns into its initial position, the arm 25 contacts the zero stop, which retains the clutch portion 122 in the disengaged position. At the same time the arm 106 of the locking pawl 105, 106 moves along a cam 108, fixedly mounted in the frame, which turns the locking pawl 105, 106, so that the end 104 of the pawl 105, 106 comes free of the projection 107. For engaging and disengaging the locking pawl 105, 106, a flywheel may be mounted on the shaft 101 to cause the shaft 101 to rotate slightly further, thereby ensuring that the locking pawl always reaches the correct final position.

The selector mechanism will not be described in detail; it can be constructed in any manner known per se.

Figure 15:
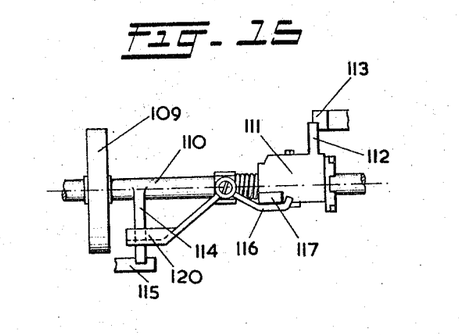
FIGS. 15 and 16 show part of an alternative embodiment of the device shown in FIG. 12–14.
Figure 16:
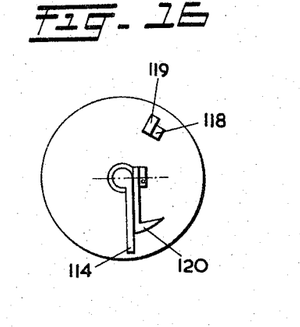

In the embodiment of FIGS. 15 and 16 the reverse happens of what has been described with reference to FIGS. 12–14. As a consequence, the spring in the selector mechanism, as well as the centrifugal regulator commonly used in telephones can be omitted.

During the outward stroke a spring 109 drives the shaft 110 until it is retained by a stop actuated by a key. During the return stroke the clutch is engaged and the motor drives the shaft, the spring 109 being retensioned while simultaneously the pulse being transmitted to the exchange.

Formed on the clutch portion 111 of the clutch is a projecting member 112 which cooperates with a conical cam 113 fixedly mounted on the frame, whereby at the end of the return stroke of the shaft the clutch portion 111 moves to the left as seen in the drawing, and the clutch is disengaged. At the end of the movement to the left arm 116 of the locking pawl 116, 120 catches behind the projection 117 of the clutch portion 111, which retains the clutch in the disengaged position. Fixedly secured to the shaft 100 is an arm 114 which, when the arm 114 is in contact with the zero stop 115, locks the shaft from further rotation.

When a key is actuated, the zero stop 115 is withdrawn and the stop associated with the actuated key is moved into its action position. By the withdrawal of the zero stop 115 the arm 114 is released and the spring 109 can allow the shaft to make its outward stroke until the arm 114 and the locking pawl arm 120 contact the actuated stop 118, 119. When the locking pawl arm 120 contacts this stop, the locking pawl 116–120 releases the clutch portion 111, so that the clutch is engaged and the motor can rotate the shaft in the opposite direction, which returns the device to its initial position.

Each stop actuated by a key has a portion 118 which cooperates with the arm 120, and a portion 119, which cooperates with the arm 114.

Figure 20:
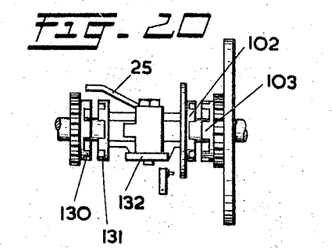
FIG. 20 shows an accelerated drive for a partial revolution of the operating shaft.

As shown in FIG. 20 an accelerated drive for the second part of the revolution of the actuating shaft can be obtained by providing on this shaft a second freely rotating dog 130, arranged to engage the clutch portion 132, which is provided with a second series of teeth 131 for the purpose, as soon as the arm 25 contacts an actuated stop. Through well-known transmission means, the motor imparts a higher rate of rotation to this second clutch than to the opposite clutch 103. A microswitch, operated by the clutch portion 132, controls the current interruption of the pulse excite after the number of pulses corresponding to the actuated key have been given.

It will be understood that in this drive system the drive spring and the centrifugal regulator of the pulse excite are omitted.

An equal setting time for all keys can be obtained by arranging the operating shaft to be driven by a one-revolution clutch and securing to the operating shaft the spring-urged stop cam with the holder of FIG. 8, which stop cam actuates a microswitch for connecting or disconnecting the current of the pulse excite the telephone.

Figure 17:
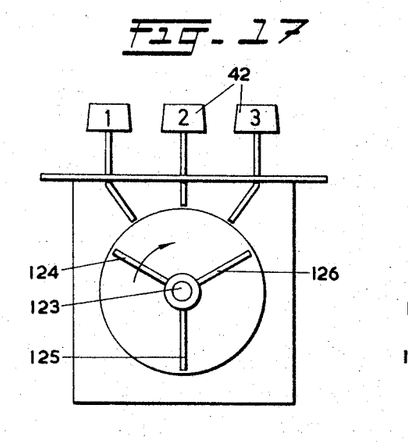
FIGS. 17, 18 and 19 show diagrammatically two other embodiments of the stops co-operating with the keyboard.
Figure 18:
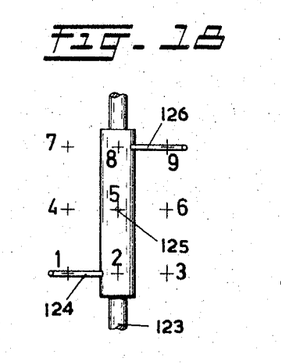

FIGS. 17 and 18 show an embodiment which comprises a considerable simplification in that on the operating shaft 123 three stop cam 124, 125 and 126 are provided each directly co-operating with three depressed keys arranged in a horizontal row (see FIG. 6). The stop cams 124, 125 and 126 are off-set by an angle of 120° relative to the preceding stop cam and spaced in the longitudinal direction of the operating shaft 123 so that they may arrive in the path of each of the three keys of each of the three rows. When a key is depressed, the operating shaft 123 rotates until the stop cam concerned comes into contact with the end of the key so that a predetermined angle of rotation corresponds with each key.

Figure 19:
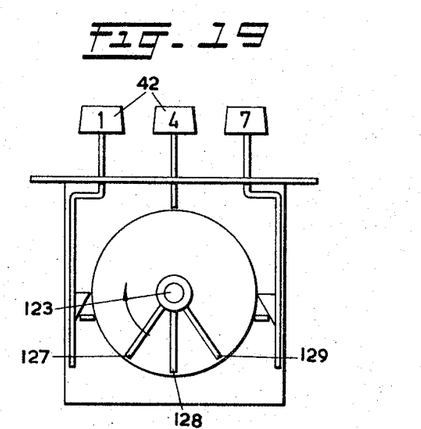

In the embodiment shown in FIG. 19 three stop cams 127, 128 and 129 each co-operate with three keys arranged in a vertical row. Consequently these stop cams arranged on the operating shaft 123 only with an angular difference of 36°.

It is obvious that instead of three stop cams which co-operate with nine stops, three stop cams may be used which co-operate with three stops in one row. In that case, however, for the setting of all numerals the operating shaft should be slidable in its longitudinal direction.

For carrying out the functions of the apparatus also the energy directly supplied by the actuating motor shaft may be utilized, for example by providing along the periphery or on the side of the driving part of the friction clutch 72 of FIG. 8 or of an independent disk mounted on the motor shaft, a number of pins 133 adapted to co-operate with a lever 134, 135 and to be brought into contact therewith in order to be able to receive the energy required for the functions and to transmit said energy to the desired members to be operated. See FIGS. 21 and 22.

The lever 134, 135 in question is for this purpose laterally slidably arranged on the shaft 136 and may be controlled with the co-operating fork 137 for example by the coupling element 19 of FIG. 1, the operating lever 86 of FIG. 8 or another similar operating member. The operating connection is resilient so that the lever 134, 135 on being operated may yield if its side would come into contact with one of the rotating pins 133.

Figures 21, 22:
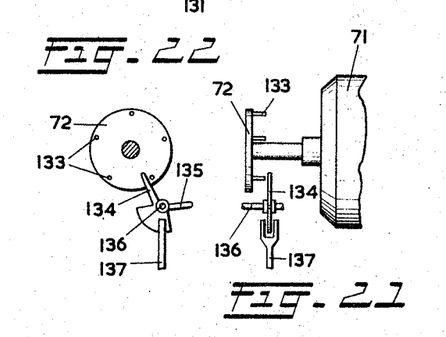
FIGS. 21 and 22 illustrate in front and side view means for transmitting the energy supplied by the actuating motor shaft.

As soon as the arms 134 is struck by a pin 133, the arm 135 of the lever can bring about the desired functions.

It will be understood that the invention is not restricted to the embodiments described above and shown in the drawings, but that numerous modifications can be made without departing from the scope of the invention. Thus for example, a carriage comprising a number of toothed wheels may be provided in a manner known per se, said toothed wheels being successively set by the setting wheel whereupon the set values of said toothed wheels are transmitted to the total wheels. In this arrangement either the setting wheel or the carriage may be slidably mounted. Also as a slipping coupling a slipping belt may be used which drives the non-slipping clutch. All embodiments are provided with one single stop cam but naturally a number of stop cams correspondingly with the number of numeral keys can be used instead.

Also, the setting time of the pulse exciter of the telephone can be reduced by an arrangement in which the operating shaft 101 of FIG. 12, after setting, is turned on to its inoperative position, i.e. in the same direction, at an increased speed.

If the key-operated stops have an inclining or declining contact surface, said surfaces being adapted to cooperate with one or more stop cams which are fixedly mounted on the operating shaft, said shaft being spring-biased in lateral direction, the operating shaft may carry out functions by its lateral displacement as soon as a stop cam comes into contact with a stop.

I claim:

1. A key-operated setting device, comprising an operating shaft to which different angular displacements are to be imparted, control means to be actuated and operated under control of said angular displacements, a plurality of keys and a corresponding plurality of stops, connecting means between said keys and said stops, supporting means to support said keys so that the latter can be depressed, and mounting means supported in a frame and mounting said stops, each of said stops being settable to an operative position by depression of one of said keys through the intermediary of said connecting means, a driven actuating shaft, a non-slipping coupling between said actuating shaft and said operating shaft to drivingly connect same, said non-slipping coupling being engageable and disengageable, transmission means arranged between said keys and said non-slipping coupling and being adapted to clutch in said non-slipping coupling on depression of any of said keys, means mounting at least one stop cam on said operating shaft to be rotatable therewith through a path into which said stops extend if set in operative position for cooperation of said stop cam with any of said stops on abutment therewith after depression of one of said keys, said cooperation bringing about a reaction force between said mounting means mounting said stops and said mounting means mounting said stop cam, at least one of said mounting means being biased by a spring and adapted to make a restricted relative movement against the bias of said spring so as to allow for a small further rotation of one of said shafts during said cooperation and to actuate said control means, said control means on actuation effecting at least the return movement of the cooperating stop from its operative position, and means for disengaging thereafter said non-slipping coupling when the operating shaft returns in its initial position on continued rotation.

2. A key-operated setting device according to claim 1, in which said actuating shaft is continuously driven by a motor.

3. A key-operated setting device according to claim 1, in which said stops are mounted along at least a part of the circumference of a circle around the operating shaft.

4. A key-operated setting device according to claim 1, in which said stop cam is mounted on means comprising the end of a finger of a brace, said brace being swingably and non-slidably arranged on said operating shaft, said stop cam mounting means being provided on a spring-biased element slidably arranged on said operating shaft, one of the cooperating parts of said non-slipping coupling being secured to one end of said spring-biased element, the other end of said spring biased element abutting against said brace, the other of the cooperating parts of said non-slipping coupling being secured to said actuating shaft.

5. A key-operated setting device according to claim 1, in which said stop cam is constituted by the end of an arm which is mounted on the operating shaft so as to be axially movable against spring bias and slidable in a slot of a support fixedly mounted on said operating shaft, said slot extending obliquely relative to said operating shaft.

6. A key-operated setting device according to claim 1, in which said mounting means mounting said stops is rotatably supported in a frame over a small angle against the action of a spring.

7. A key-operated setting device according to claim 1, characterized in that for each of the keys an operating rod for the stops is provided, said rod being slidably arranged in the frame, said stops consisting of likewise slidably mounted parts operable by said operating rods.

8. A setting device according to claim 1, characterized by means which after rotation of the operating shaft through an angle corresponding with the operated key are actuated to carry-out one or more of required functions, such as for example connecting or disconnecting the setting member to or from the setting mechanism, returning the operated parts of the apparatus to the positions of rest, after which the operating shaft is returned to its initial position.

9. A setting device according to claim 1, in which, the operating shaft after rotation through an angle corresponding with the operated key is turned into its initial position at an accelerated speed in the same direction of rotation.

10. A key-operated setting device for use in calculating machines and the like comprising a frame, a totalizer, an operating shaft provided with at least one setting pinion for entering data into said totalizer, a plurality of operating numeral keys, a number of stops, said number of stops corresponding with the number of keys, each of said stops being settable by one of said keys for defining the angular displacement of the setting pinion cooperating with the totalizer said operating shaft being provided with a plurality of stop cams, each stop cam being disposed to engage a number of the stop, said stop cams being displaced over an angle and spaced in the longitudinal direction of the operating shaft.

11. A key-operated device for imparting a number of different angular displacements to a first shaft, comprising a number of keys and a number of stops, said number of stops corresponding with the number of keys, each of said stops being settable by one of said keys for defining the angular displacement of said first shaft, said first shaft being provided with at least one stop cam cooperating with said stops, a second shaft continuously driven by a motor, a non-slipping coupling provided between said second shaft and the first shaft, a transmission mechanism between said keys and the non-slipping coupling for clutching in said non-slipping coupling on actuation of a key until the stop cam abuts against the stop actuated by the operated key and means for throwing out said non-slipping coupling when the first shaft is brought in its initial position.

12. A key-operated device for imparting a number of different angular displacements to a first shaft, comprising a number of keys and a number of stops, said number of stops corresponding with the number of keys, said stops being arranged along at least part of the circumference of a circle around the driving shaft and being slidable in a means carrying said stops, each of said stops being settable by one of said keys for defining the angular displacement of said first shaft, said first shaft being provided with at least one stop cam cooperating with said stops, a second shaft continuously driven by a motor, a non-slipping coupling provided between said second shaft and the first shaft, a transmission mechanism between said keys and the non-slipping coupling for clutching in said non-slipping coupling on actuation of a key until the stop cam abuts against the stop actuated by the operated key and means for throwing out said non-slipping coupling when the first shaft is brought in its initial position.

References Cited

UNITED STATES PATENTS

| | | | |
|---|---|---|---|
| 2,021,327 | 11/1935 | Phinney | 235—11 |
| 3,093,304 | 6/1963 | Starrett | 235—60 |
| 3,095,143 | 6/1963 | Oldenburg et al. | 235—60 |

STEPHEN J. TOMSKY, *Primary Examiner.*

RICHARD B. WILKINSON, *Examiner.*

S. A. WAL, *Assistant Examiner.*